(12) United States Patent
Gopalakrishnan et al.

(10) Patent No.: US 9,413,215 B2
(45) Date of Patent: Aug. 9, 2016

(54) TRANSMISSION ASSEMBLY WITH INTEGRATED MOTOR POSITION SENSOR

(71) Applicant: GM GLOBAL TECHNOLOGY OPERATIONS LLC, Detroit, MI (US)

(72) Inventors: Suresh Gopalakrishnan, Farmington Hills, MI (US); Chandra S. Namuduri, Troy, MI (US); Peter Bostwick, Rochester, MI (US); Edward L. Kaiser, Orion, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 577 days.

(21) Appl. No.: 13/772,981

(22) Filed: Feb. 21, 2013

(65) Prior Publication Data

US 2013/0221810 A1    Aug. 29, 2013

Related U.S. Application Data

(60) Provisional application No. 61/604,568, filed on Feb. 29, 2012.

(51) Int. Cl.
*H02K 29/06* (2006.01)
*H02K 29/08* (2006.01)
*H02K 29/12* (2006.01)

(52) U.S. Cl.
CPC ............... *H02K 29/06* (2013.01); *H02K 29/08* (2013.01); *H02K 29/12* (2013.01)

(58) Field of Classification Search
CPC ... H02K 11/00; H02K 7/006; H02K 11/0015; H02K 11/0021; B60K 6/40
USPC .............. 310/68 B; 477/5; 475/5; 324/207.25
See application file for complete search history.

(56) References Cited

U.S. PATENT DOCUMENTS

| | | | |
|---|---|---|---|
| 4,586,401 A | 5/1986 | Nogle | |
| 7,285,949 B2 | 10/2007 | Burns et al. | |
| 7,579,827 B2 | 8/2009 | Burns et al. | |
| 8,333,680 B2 * | 12/2012 | Kasuya et al. | 477/5 |
| 2006/0186627 A1 * | 8/2006 | Koyagi et al. | 280/93.512 |
| 2010/0139452 A1 * | 6/2010 | Holmes et al. | 74/606 R |
| 2013/0119833 A1 * | 5/2013 | Ikuta | 310/68 B |

* cited by examiner

*Primary Examiner* — Burton Mullins

(57) ABSTRACT

A transmission-mounted electric machine includes an integrated rotational position sensor. The rotational position sensor includes a rotor element and a stator element. The stator element is attached to a stator element of the transmission at a plurality of mounting points and includes an alignment adjustment mechanism. The rotor element of the sensor is slip-fit against a shoulder of a rotor hub and held in place using a wave spring.

17 Claims, 2 Drawing Sheets

TRANSMISSION ASSEMBLY WITH INTEGRATED MOTOR POSITION SENSOR

CROSS REFERENCE TO RELATED APPLICATIONS

This application claims the benefit of U.S. Provisional Application No. 61/604,568 filed on Feb. 29, 2012 which is incorporated herein by reference.

TECHNICAL FIELD

This disclosure is related to transmission systems for powertrain systems that include transmission-mounted torque machines, and position sensors mounted thereon.

BACKGROUND

The statements in this section merely provide background information related to the present disclosure. Accordingly, such statements are not intended to constitute an admission of prior art.

Known vehicle systems employ powertrain systems including non-hydrocarbon-fueled torque machines, e.g., electric machines to transform electric power to mechanical torque to generate tractive effort and transform mechanical effort to electrical power. Such powertrain systems include hybrid powertrain systems, electric vehicle systems, and extended-range electric vehicle powertrain systems. Such powertrain architectures may be configured to transfer tractive torque to an output member through a transmission device. Known hybrid powertrain architectures can include series-hybrid configurations, parallel-hybrid configurations, and compound-split hybrid configurations. Electric machines configured to operate as motors and generators can be controlled to generate torque inputs to the transmission independently from a torque input from an internal combustion engine. The electric machines may react and transform vehicle kinetic energy transmitted through the vehicle driveline to electrical energy that is storable in an electrical energy storage device employing regenerative braking and other methods.

High-resolution position sensors, e.g., reluctance-type resolvers, may be used to determine rotor position feedback. The resolvers provide rotor position information with high resolution at high accuracy suitable for precise torque and position control in the torque machines. Known reluctance-type resolvers are mounted at one end of a motor shaft with an inner rotor/outer stator arrangement or an outer rotor/inner stator arrangement, and provide rotor position feedback. Issues associated with mounting high-resolution position sensors in transmission systems include limited space availability and packaging constraints. Packaging a position sensor onto a motor shaft within a transmission device can introduce challenges due to limited space availability.

SUMMARY

A transmission-mounted electric machine includes an integrated rotational position sensor. The rotational position sensor includes a rotor element and a stator element. The stator element is attached to a stator element of the transmission at a plurality of mounting points and includes an alignment adjustment mechanism. The rotor element of the sensor is slip-fit against a shoulder of a rotor hub and held in place using a wave spring.

BRIEF DESCRIPTION OF THE DRAWINGS

One or more embodiments will now be described, by way of example, with reference to the accompanying drawings, in which.

DETAILED DESCRIPTION

Figure 1:
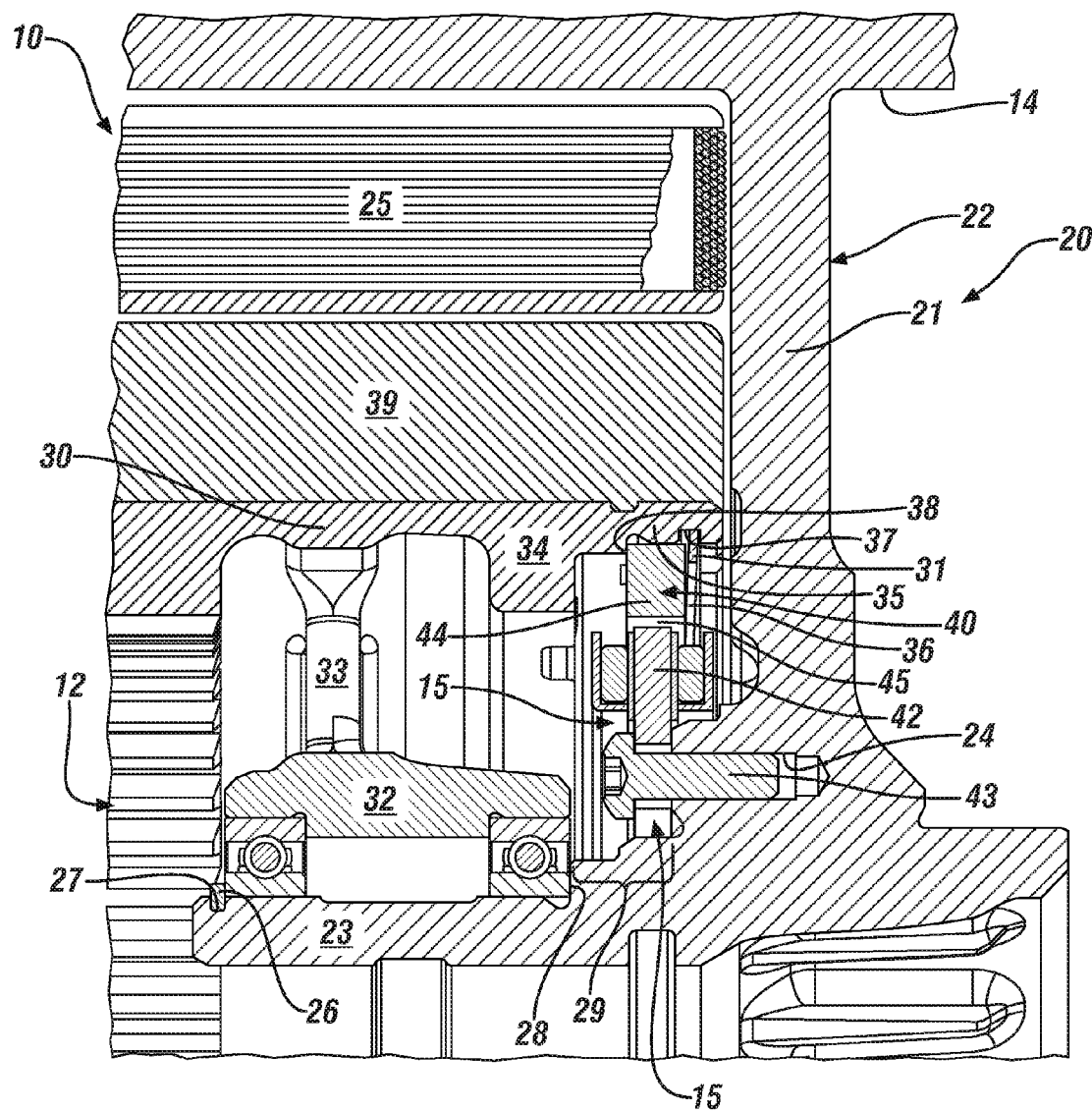
FIG. 1 illustrates an exemplary transmission including a transmission-mounted torque machine having an inner rotor and outer stator and including a rotational position sensor arranged with a radial airgap, in accordance with the disclosure.
Figure 2:
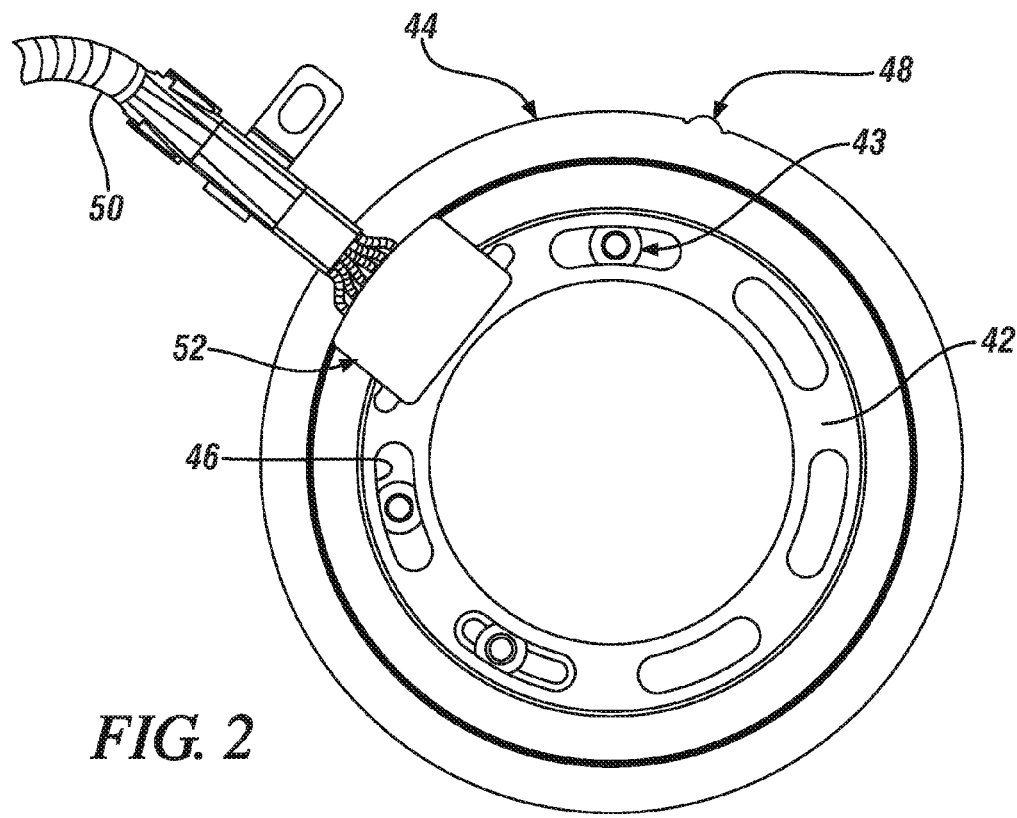
FIG. 2 illustrates the exemplary transmission including the transmission-mounted torque machine having the inner rotor and outer stator configuration with the rotational position sensor arranged with the radial airgap, in accordance with the disclosure.

Referring now to the drawings, wherein the showings are for the purpose of illustrating certain exemplary embodiments only and not for the purpose of limiting the same, FIGS. 1 and 2 show partial views of a transmission system 10 including an integrated torque machine 20 configured with an annular-shaped sensor envelope 15 that accommodates an integrated rotational position sensor 40. The torque machine 20 is configured to generate and transfer torque to a transmission output member via rotating and fixed elements of the transmission system 10 for use in propulsion and other functions. FIG. 1 shows a partial sectional view of the transmission system 10, and FIG. 2 shows a partial plan view of the transmission system 10. The torque machine 20 is an electrically-powered motor/generator. Alternatively, the torque machine 20 may employ another form of non-combustion power, e.g., hydraulic power or pneumatic power. The torque machine 20 in this embodiment is arranged in a configuration that includes an outer stator 22, a coaxial inner rotor 30, and the rotational position sensor 40 assembled into the sensor envelope 15 to monitor rotational position of the rotor 30 in relation to the stator 22.

The stator 22 includes an annular-shaped first electric motor portion 25 and a frame 21 that is secured to a case 14 of the transmission 10 to provide structural support for a spindle 23 that projects axially from the frame 21. The spindle 23 includes a non-bearing portion 29, a shoulder 28, and a counter-cut recess 27, with a cylindrically-shaped outer bearing surface between the shoulder 28 and the counter-cut recess 27. A retaining ring 26 can be inserted into the counter-cut recess 27, thus mechanically securing a bearing portion 32 of the rotor 30 onto the outer bearing surface of the spindle 23. The shoulder 28 of the stator 22 defines and thus limits axial location of the bearing portion 32 of the rotor 30 in relation to the frame 21. The non-bearing portion 29 of the spindle 23 is located between the shoulder 28 of the stator 22 and the frame 21. Mounting bolt holes 24 are machined into the frame 21 in an annular pattern to provide mounting support for the position sensor 40.

The rotor 30 includes the bearing portion 32, a support portion 33, and a rotor hub 34. The rotor hub 34 includes an outer cylindrically-shaped surface that couples to an annular-shaped second electric motor portion 39 that is coaxial with and adjacent to the first electric motor portion 25. The rotor hub 34 includes a hub extension 35 that extends axially in one direction beyond the bearing portion 32 towards the frame 21 of the stator 22. The hub extension 35 of the rotor hub 34 includes an inner surface including a first shoulder 38 and a recess 37. The rotor 30 fixedly couples to a gear element 12 of the transmission 10 and rotates therewith. The bearing portion 32 of the rotor 30 mounts onto the outer bearing surface of the spindle 23 permitting the rotor 30 to rotate thereon, with the direction of rotation determined based upon operating parameters of the torque machine 20 and the transmission 10. The bearing portion 32 includes suitable elements that can be inserted onto the bearing portion of the spindle 23 for rotating thereon, including, e.g., roller bearings or other elements permitting low-friction rotation.

The annular-shaped sensor envelope 15 is formed between an inner surface of the hub extension 35 of the rotor 30 and an outer surface of the non-bearing portion 29 of the spindle 23. The sensor envelope 15 accommodates any one of a plurality of types of rotational position sensors 40, examples of which are described in Table 1.

The rotational position sensor 40 includes a sensor stator 42 that is mechanically decoupled from a sensor rotor 44, preferably including an airgap 45 formed therebetween. The sensor stator 42 assembles onto and fixedly attaches to the spindle 23 of the stator 22. The sensor rotor 44 fixedly attaches to the rotor hub 34. The sensor stator 42 and the sensor rotor 44 are configured to form a radially-oriented airgap 45 as shown. The sensor stator 42 includes a wiring harness 50 and harness support 52 including a strain relief element. The wiring harness 50 and harness support 52 are employed to enable routing of power supply and signal cables between the sensor stator 42 and an on-vehicle control module.

Control module, module, control, controller, control unit, processor and similar terms mean any one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs or routines, combinational logic circuit(s), input/output circuit(s) and devices, appropriate signal conditioning and buffer circuitry, and other components to provide the described functionality. Software, firmware, programs, instructions, routines, code, algorithms and similar terms mean any instruction sets including calibrations and look-up tables. The control module has a set of control routines executed to provide the desired functions. Routines are executed, such as by a central processing unit, and are operable to monitor inputs from sensing devices and other networked control modules, and execute control and diagnostic routines to control operation of actuators. Routines may be executed at regular intervals, for example each 3.125, 6.25, 12.5, 25 and 100 milliseconds during ongoing engine and vehicle operation. Alternatively, routines may be executed in response to occurrence of an event.

The sensor stator 42 includes a plurality of alignment slots 46, and is fixedly attached to the stator 22 of the torque machine 20 using a plurality of mounting bolts 43 that pass through the alignment slots 46 and fasten the sensor stator 42 to the stator 22. Angular adjustment and alignment of the sensor stator 42 in relation to the sensor rotor 44 can be accomplished by rotationally adjusting the sensor stator 42 within the alignment slots 46, e.g., in relation to a rotor key 48 using a suitable alignment process during assembly. The alignment slots 46 are preferably curved, but can be any suitable shape that permits rotational adjustment about the axis of rotation, e.g., a linear shape. The mounting bolt holes 24 are preferably located to avoid other features, e.g., oil lube lines, and permit rotational freedom to place the bolts 43.

The sensor rotor 44 slip-fits into the rotor hub 34 with the rotor key 48 inserted into a corresponding keyway on the rotor 30 in one embodiment, or can be otherwise aligned with the rotor 30. The sensor rotor 44 fits against the first shoulder 38 and is held securely in place by a wave spring 36. The tolerance between the inside diameter of the rotor hub 34 at the hub portion 35 and the outside diameter of the sensor rotor 44 is sufficiently tight to minimize radial movement of the sensor rotor 44 in relation to the rotor hub 34 while allowing assembly thereof. The wave spring 36 maintains compressive force on the sensor rotor 44 against the first shoulder 38 thereby securing the sensor rotor 44 in place to prevent axial movement of the sensor rotor 44 in relation to the rotor hub 34 and prevent rotation of the sensor rotor 44 in relation to the rotor 30. The wave spring 36 is preferably deployed in conjunction with a locking snap ring 31 that inserts into the recess 37 formed on the inside face of the rotor hub 34 to fixedly secure the sensor rotor 44 against the first shoulder 38. Axial force from the wave spring 36 onto the sensor rotor 44 prevents rotation of the sensor rotor 44 in relation to the rotor hub 34 through friction. On embodiments employing rotor key 48, axial force from the wave spring 36 onto the sensor rotor 44 in conjunction with insertion of the rotor key 48 into the keyway of the rotor 30 prevents rotation of the sensor rotor 44 in relation to the rotor hub 34 through friction and interference.

Implementation of the transmission system 10 including the integrated torque machine 20 configured with the annular-shaped sensor envelope 15 between the stator 22 and the rotor 30 to accommodate the rotational position sensor 40 permits design flexibility in sensor selection, sensor mounting and transmission assembly without affecting sensor functional performance and with minimal or no changes to existing rotor/stator designs to accommodate alternative sensor types.

The rotational position sensor 40 may include any one of a plurality of sensor types, including by way of example a reluctance-type sensor, an inductive-type sensor, a magnetic-digital-type sensor, and a magnetic-analog Hall-effect type sensor. Table 1 provides operating characteristics of suitable sensors, including working principle, stator, rotor, excitation signal and preferred airgap, which are described for each indicated sensor type.

TABLE 1

| Sensor Type | Working Principle | Stator | Rotor | Excitation | Airgap |
| --- | --- | --- | --- | --- | --- |
| Reluctance | Measures reluctance variation | Single excitation coil; two sense coils | Reluctance with shaped saliency | High frequency excitation in the stator coil | Radial |
| Inductive | Evaluates eddy current loss in a conductive trace | Two sets of excitation coils | Shaped conductive trace | High frequency excitation in the stator coils | Radial or Axial |
| Magnetic digital Hall-effect | Multiplying Hall-effect | Hall sensor array on an ASIC | Magnetic ring with high resolution track and low resolution track | Single 5 V power supply | Radial or Axial |
| Magnetic analog | Measures positional | Set of Hall | Spatially magnetized | Single 5 V power | Radial |

TABLE 1-continued

| Sensor Type | Working Principle | Stator | Rotor | Excitation | Airgap |
|---|---|---|---|---|---|
| Hall-effect | variation of the magnetic field | sensors | ring m2agnet | supply | 5 |

This list of sensor types for the rotational position sensor 40 is meant to be illustrative and not exhaustive. Preferred specification parameters for the rotational position sensor 40 include an acceptable accuracy, for example within ±1° to ±3° electrical degrees having a suitable resolution over a wide speed range, for example over a speed range of 0±15,000 RPM (mechanical) in one embodiment. As appreciated, a rotational angle in mechanical degrees has an equivalent angle in electrical degrees in relation to a number of pole pairs for the electric machine. For example, 1° electrical rotation has an equivalent mechanical rotation of 0.166° for an electric machine having 6-pole pairs. The sensor has an operational temperature range between −40° C. to +140° C. in one embodiment, and is compatible with automatic transmission fluids.

Figure 3:
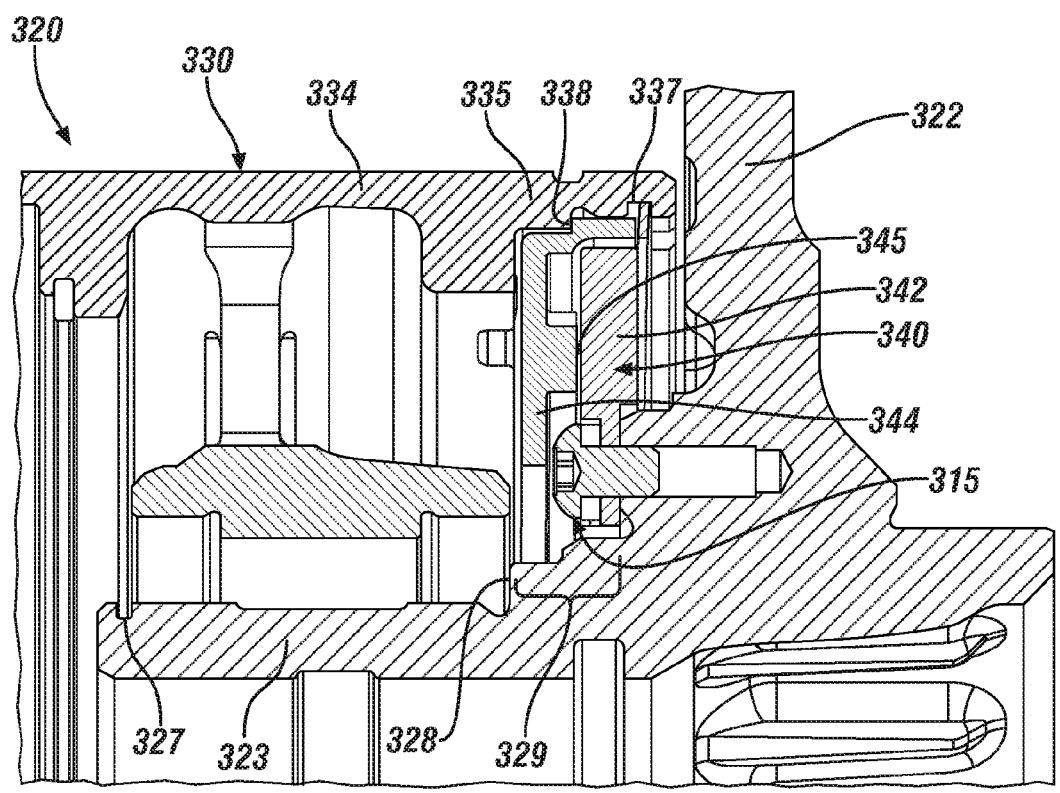
FIG. 3 illustrates the exemplary transmission including the transmission-mounted torque machine having an inner rotor and outer stator configuration and the rotational position sensor arranged with an axial airgap, in accordance with the disclosure.

FIG. 3 shows partial sectional view of an integrated torque machine 320 for a transmission system configured with an annular-shaped sensor envelope 315 that accommodates an embodiment of an integrated rotational position sensor 340. The transmission system and integrated torque machine 320 are analogous to the system described with reference to FIG. 1. The sensor envelope 315 is analogous to the sensor envelope 15 described with reference to FIG. 1. The annular-shaped sensor envelope 315 is formed between an inner surface of hub extension 335 of the rotor 330 and an outer surface of a non-bearing portion 329 of a spindle 323 of stator 322. The sensor envelope 315 accommodates any one of a plurality of types of rotational position sensors 340, examples of which are described in Table 1. The stator 322 includes the non-bearing portion 329, shoulder 328, and counter-cut recess 327, with a cylindrically-shaped outer bearing surface between the shoulder 328 and the counter-cut recess 327. The rotor 330 includes rotor hub 334 including hub extension 335, shoulder 338 and recess 337. The rotational position sensor 340 includes a sensor stator 342 that is mechanically decoupled from a sensor rotor 344 via including an axial airgap 345 formed therebetween. The sensor stator 342 is fixedly attached to the stator 322 of the torque machine 320 and the sensor rotor 344 is fixedly attached to the rotor 324 of the torque machine 320. The annular-shaped sensor envelope 315 is thus configured to accommodate the rotational position sensor 340 including axial airgap 345.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. An apparatus including a transmission assembly with an integrated torque machine, comprising:
the torque machine including a stator with a frame secured to a case of the transmission and providing structural support for an axially projecting spindle, the spindle including a non-bearing portion;
the torque machine including a rotor configured to rotate on the spindle and fixedly coupled to a rotatable gear element of the transmission to rotate therewith, the rotor including a rotor hub with a hub extension including an inner surface with a first shoulder;
an annular-shaped sensor envelope formed between the hub extension of the rotor hub and the non-bearing portion of the spindle, said sensor envelope configured to accommodate a rotational position sensor; and
the rotational position sensor configured to monitor rotational position of the rotor in relation to the stator and including a rotor element and a stator element, wherein said sensor rotor element is mechanically decoupled from the sensor stator element and an airgap is formed between the sensor rotor element and the sensor stator element;
wherein the sensor rotor element is inserted into the hub extension of the rotor hub and secured between the first shoulder of the inner surface and a wave spring, further comprising a locking snap ring inserted into a recess on the rotor hub.

2. The apparatus of claim 1, wherein the annular-shaped sensor envelope is formed between an inner surface of the hub extension and an outer surface of the non-bearing portion of the spindle.

3. The apparatus of claim 1, wherein the airgap formed between the sensor rotor element and the sensor stator element comprises a radial airgap.

4. The apparatus of claim 1, wherein the airgap formed between the sensor rotor element and the sensor stator element comprises an axial airgap.

5. The apparatus of claim 1, wherein the rotational position sensor comprises an inductive sensor.

6. The apparatus of claim 1, wherein the rotational position sensor comprises a magnetic digital Hall-effect sensor.

7. The apparatus of claim 1, wherein the rotational position sensor comprises a magnetic analog Hall-effect sensor.

8. The apparatus of claim 1, wherein the rotational position sensor comprises a reluctance sensor.

9. The apparatus of claim 1, wherein the sensor rotor element further comprises a rotor key inserted into a keyway of the rotor.

10. The apparatus of claim 1, wherein the sensor stator element is fixedly assembled onto the non-bearing portion of the spindle of the stator and mechanically attached to the frame of the stator.

11. The apparatus of claim 10, wherein the sensor stator element comprises a plurality of alignment slots through which mounting bolts secure the sensor stator element to the frame of the stator.

12. A transmission assembly, comprising:
an integrated torque machine including a stator and a rotor;
an annular-shaped sensor envelope formed between a hub extension of a hub of the rotor and a non-bearing portion of a spindle of the stator, said sensor envelope configured to accommodate rotational position sensor; and
the rotational position sensor including a sensor rotor element mechanically decoupled from a sensor stator element such that an airgap is formed therebetween, the rotational position sensor configured to monitor rotational position of the rotor in relation to the stator;
wherein the sensor rotor element is inserted into the hub extension of the rotor hub and secured between a shoulder of the rotor hub and a wave spring, further comprising a locking snap ring inserted into a recess on the rotor hub.

13. The apparatus of claim 12, wherein the airgap formed between the sensor rotor element and the sensor stator element comprises a radial airgap.

14. The apparatus of claim 12, wherein the airgap formed between the sensor rotor element and the sensor stator element comprises an axial airgap.

15. The apparatus of claim 12, wherein the sensor rotor element further comprises a rotor key inserted into a keyway of the rotor.

16. The apparatus of claim 12, wherein the sensor stator element is fixedly assembled onto the non-bearing portion of the spindle of the stator and mechanically attached to a frame of the stator.

17. The apparatus of claim 16, wherein the sensor stator element comprises a plurality of alignment slots through which mounting bolts secure the sensor stator element to the frame of the stator.

* * * * *